United States Patent

Blomqvist et al.

[11] Patent Number: 6,109,525
[45] Date of Patent: *Aug. 29, 2000

[54] METHOD AND DEVICE FOR REGISTERING VEHICLES IN A ROAD TOLL FACILITY

[75] Inventors: Kenneth Blomqvist, Jonkoping; Anders Hjelmare, Granna; Lars Olsson, Jonkoping, all of Sweden

[73] Assignee: Saab-Scania Combitech Akitiebolag, Jonkoping, Sweden

[*] Notice: This patent is subject to a terminal disclaimer.

[21] Appl. No.: 09/045,021

[22] Filed: Mar. 20, 1998

Related U.S. Application Data

[63] Continuation-in-part of application No. 08/553,514, Mar. 14, 1996, Pat. No. 5,859,415.

[30] Foreign Application Priority Data

| May 28, 1993 | [SE] | Sweden | 9301842 |
| Sep. 30, 1993 | [SE] | Sweden | 9303203 |
| May 27, 1994 | [WO] | WIPO | PCT/SE94/00504 |

[51] Int. Cl.⁷ ................................................. G07B 15/02
[52] U.S. Cl. ...................... 235/384; 235/380; 235/382; 340/928; 340/941
[58] Field of Search .................... 235/375, 380, 235/382, 384; 340/928, 933, 937, 941

[56] References Cited

U.S. PATENT DOCUMENTS

| 3,377,616 | 4/1968 | Auer, Jr. | 235/384 X |
| 4,075,632 | 2/1978 | Baldwin et al. | |
| 4,104,630 | 8/1978 | Chasek | |
| 4,242,661 | 12/1980 | Henoch et al. | |
| 4,303,904 | 12/1981 | Chasek | |
| 4,368,979 | 1/1983 | Ruell | 356/71 |
| 4,555,618 | 11/1985 | Riskin | |
| 4,908,500 | 3/1990 | Baumbergeil | 235/384 |
| 4,989,084 | 1/1991 | Wetzel | 358/108 |
| 5,086,389 | 2/1992 | Hassett et al. | 235/384 X |
| 5,144,553 | 9/1992 | Hassett et al. | 235/384 X |
| 5,204,675 | 4/1993 | Sekine | |
| 5,253,162 | 10/1993 | Hassett et al. | 235/384 X |
| 5,406,275 | 4/1995 | Hassett et al. | 235/384 X |
| 5,422,473 | 6/1995 | Kamata | 235/384 |
| 5,440,109 | 8/1995 | Hering et al. | 235/384 |
| 5,581,249 | 12/1996 | Yoshida | 235/384 X |
| 5,859,415 | 1/1999 | Blomqvist et al. | 235/384 |
| 5,864,831 | 1/1999 | Schuessler | 705/417 |

FOREIGN PATENT DOCUMENTS

| 60-10112 | 1/1985 | Japan. |
| 2-183389 | 7/1990 | Japan. |
| 2219881 | 12/1989 | United Kingdom. |
| WO90/14640 | 11/1990 | WIPO. |
| 91/20067 | 12/1991 | WIPO. |

*Primary Examiner*—Michael G Lee
*Attorney, Agent, or Firm*—Hale and Dorr LLP; Irah H. Donner

[57] ABSTRACT

A system and method of registering vehicles in a road toll facility is provided with radio transmitter and receiver equipment (7) for microwaves arranged to communicate with vehicle units (12) provided in the vehicles (4), preferably including a transponder. On command from the road toll facility, an identity is obtained from the in-vehicle unit and a toll debiting operation is performed. When a vehicle (4) enters the toll facility, it is detected via the activation of the toll facility radio equipment (7) if the vehicle (4) is provided with a vehicle unit (12) and if it has performed a correct payment operation. Vehicles for which such operations cannot take place are exposed to a successive position determination via video cameras (9) through an image processing in which the vehicle in question is tracked between a predetermined recording site and the location where the payment status of the vehicle has been established via the radio equipment. In the recording site, the number plate of the vehicle is recorded for identification via a video camera (10) which identification, in conjunction with data such as time and place, is used for search and for post-debiting of the toll.

22 Claims, 2 Drawing Sheets

6,109,525

METHOD AND DEVICE FOR REGISTERING VEHICLES IN A ROAD TOLL FACILITY

RELATED APPLICATIONS

This patent application is a continuation-in-part patent application from U.S. application Ser. No. 08/553,514, filed Mar. 14, 1996, now U.S. Pat. No. 5,859,415 incorporated herein by reference.

TECHNICAL FIELD

The present invention relates to a method and device for registering vehicles in a road toll facility. More specifically, the invention relates to a method and device in such road toll facilities, where fee debiting can take place through wireless transmission of radiowaves between vehicles and equipment in the road toll facility, respectively. The present invented is particularly suited for use in road toll facilities that are arranged to enable a free traffic flow through the toll facility.

BACKGROUND

It is known to arrange road toll facilities for automatic fee debiting, see for example U.S. Pat. No. 4,303,904 (Chasek) and U.S. Pat. No. 5,144,553 (Hassett et al), incorporated herein by reference.

Such systems to which the present invention refers, presuppose that the majority of vehicles that pass the road toll facility, are provided with a receiver-transmitter unit for radiowaves, such as microwaves. The road toll facility comprises an arrangement by which communication by radiowaves can take place with passing vehicles. This arrangement comprises a transmitter and receiver unit, or a transceiver, for the radiowaves by means of which equipment payment and debiting operations can be carried out for the passing vehicles provided with said receiver and transmitter unit. The transmitter receiver unit usually has the form of a transponder. For this technique compare U.S. Pat. No. 4,075,632 and U.S. Pat. No. 4,242,661, for example, incorporated herein by reference.

However, it may occur that vehicles which are not provided with any receiver and transmitter equipment pass through the toll facility and, therefore, cannot be identified by means of the radiowaves. For identification of such vehicles, if these attempt at passing the toll facility without paying toll, the toll arrangement is provided with camera devices for image registration of the number plates of the vehicles in question for search and post-debiting.

The most advanced system for road tolls of this kind should be adapted to a great flow of traffic in free formation. In such an arrangement, it should be possible for the vehicle to travel a certain distance from the time when a registration has been possible to determine whether the vehicle is identifiable through radiowaves or not, and until the recording operation regarding the number plate has been concluded.

During this displacement, a separation must be maintained in such vehicles for which search and post-debiting shall take place, and such for which payment is to be secured by means of the radio communication. This requires additionally that the toll arrangement is also provided with equipment for positioning detection when the vehicles travels in free flow without determined lanes. A known way to detect the position of a vehicle or other body is to process reflected radiowaves which have been received by two or more antennae. By successive position detection of moving vehicle it is possible to track the same. Such a tracking system is known from CA,C,2,100,723 (O'Connor et al.).

In the present connection the transponder of the vehicle equipment functions as reflecting means to accomplish the position detection. Thereby the position of the vehicle is, during its movement, successively measured against a transponder in the vehicle by means of the position detection transmitter-receiver equipment, which in each unit has at least two receiver elements. The phase position in the signal received from the various elements are compared, by which the direction and position of the vehicle can be calculated. This position determination is consequently related to the transponder of the vehicle.

SUMMARY OF THE INVENTION

The invention is described with reference partly to a method and partly to a combination of devices, which enable detection and performance of payment operations for vehicles which are provided with authorized equipment, as well as registration by recording of the number plate or other identity characteristics of such vehicles for which no approved payment operation has been possible to perform during the passage through the toll facility. As the recording of the identity characteristic has to be made in a certain recording site or predefined area, it has been determined that in a free traffic flow toll arrangement it is necessary to track the vehicle between a position or initial area, in which it has been possible to establish if it is possible to communicate with and detect the position of vehicle, and the recording site. According to the invention for the latter operation, the image recording by means of video cameras are utilized for tracking at least the vehicles which are not equipped with my transponder and for which a recording of the number plate shall be registered. Safety is thereby obtained that the same vehicle which, on passing through the toll facility has been established to lack an acceptable equipment for automated toll payment, can be correctly connected with the registered recording of the vehicles identity. The tracking process can also be used as an alternative or a complement to tracking by means of reflected radiowaves from the vehicles transponders, in order to secure or ensure that the result of the payment operation by means of the radio communication is correlated to the recording of the registration characteristic of the vehicle.

BRIEF DESCRIPTION OF THE DRAWINGS

In the accompanying drawings a preferred embodiment of the invention is illustrated, wherein.

DETAILED DESCRIPTION OF PREFERRED EMBODIMENTS OF THE INVENTION

Figure 1:
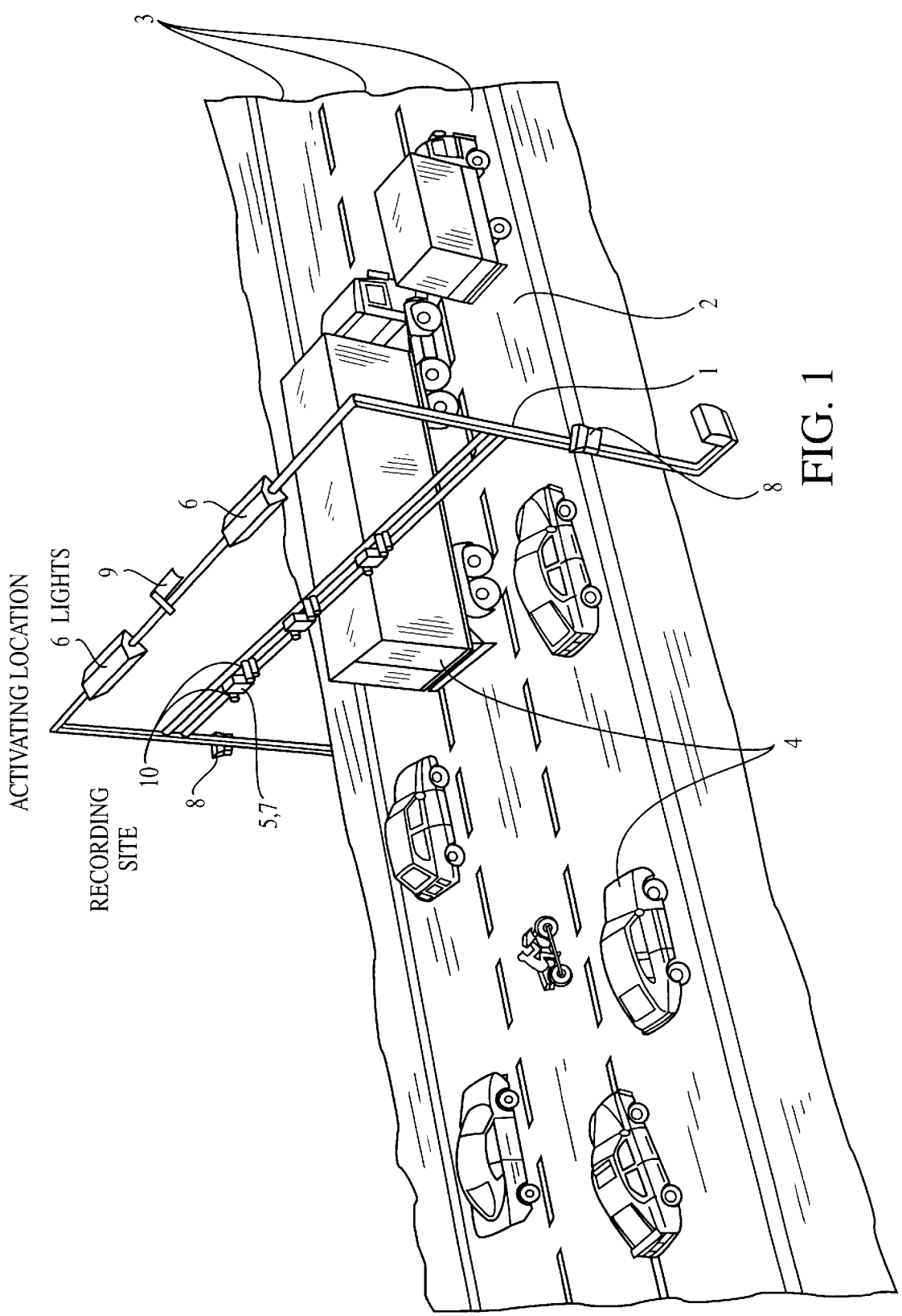
FIG. 1 shows, in perspective, a road toll arrangement.

According to FIG. 1, an automatic road toll facility, according to the invention, is provided with a support for the equipment belonging to the road side unit of the toll. The support has the form of a portal-like gantry 1, which extends above a road 2, which has three lanes 3 in which vehicles 4 of different kinds can proceed through the gantry 1. The traffic is not limited to keeping or staying within the lanes under the gantry, but is allowed to perform lane changes and over-takings or vehicle passing. It is thus a free-flow system, which is designed to, as little as possible, disrupt the traffic flow providing the feature of unrestricted traffic flow, providing the feature of unrestricted traffic flow.

On the gantry, there are attached two light fittings 6 and a radio system including number of transmitter and receiver units 7 for microwave communication with passing vehicles. Three transmitter and receiver units 7 are shown in FIG. 1, including antennae for each. Also, equipment 5 for vehicle position detection is included in the radiosystem. According to the preferred embodiments, the same equipment is divided on three units each comprising one transmitter antenna and two receiver antennae spaced apart from each other. The communication units and the position detection units can at least partly be integrated to each other.

In addition there is on either side a video camera 8, directed at the approaching traffic flow to register vehicles which unpermittedly or inappropriately are driven on the verge or shoulder of the road. In addition, at the top center of the gantry are shown video cameras 9 for tracking of the moving vehicles. In the same way, recording cameras are shown as three pairs of video cameras 10 directed forwards and backwards, respectively. These cameras are located approximately at the center of each of the three lanes 3, respectively, in a position along the road mentioned as the recording site.

All this equipment is connected to a computer wit 11 for the control of same and for processing recorded data including image processing. This unit is in turn connected to a central net for further communication.

Figure 2:
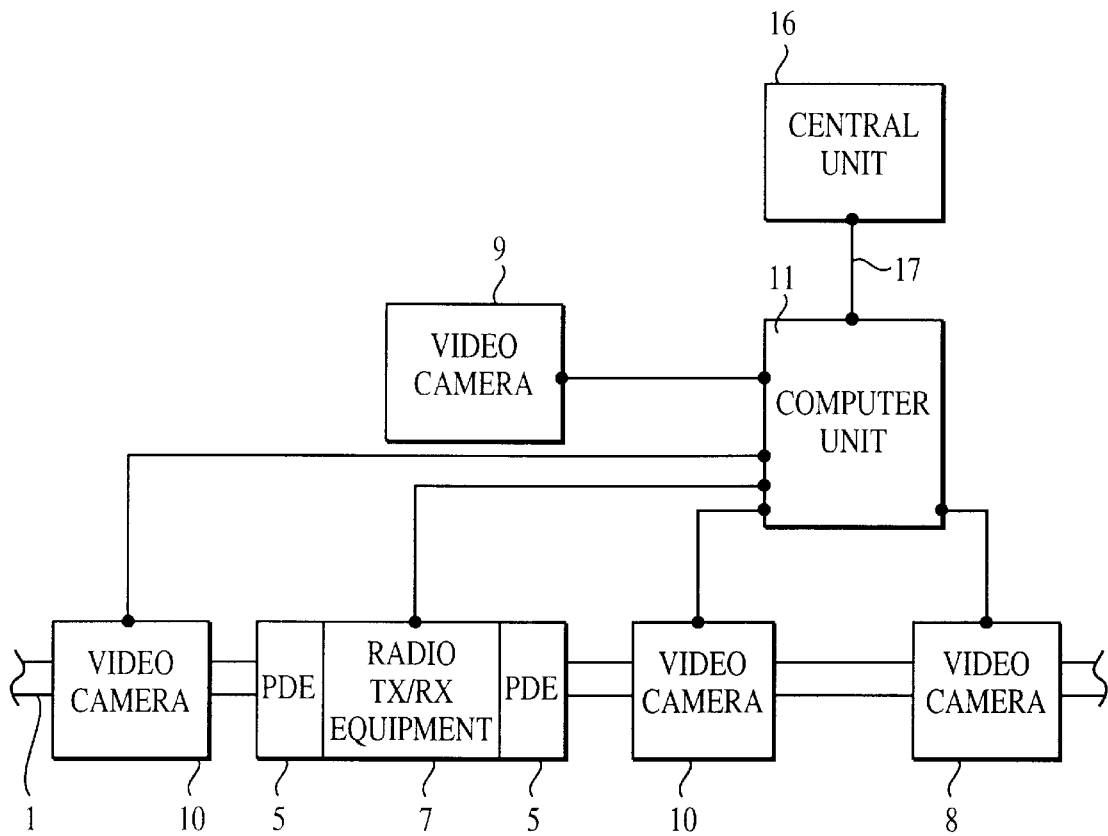
FIG. 2 allows a block diagram for the main elements of function of the road toll system.
Figure 2:
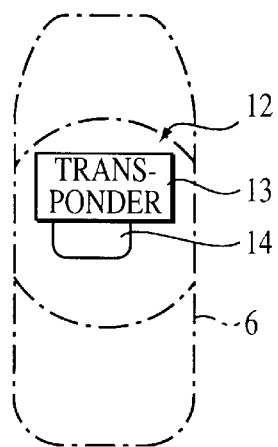

The main functions and function units of the arrangement are schematically represented in the block diagram in FIG. 2. Therein, 12 designates the equipment understood to be provided in the majority of vehicles 4.

Such equipment is understood to comprise a transponder 13, which is arranged to pick up radiowaves and re-transmit the signal transformed into an answer signal comprising information enabling a payment operation for the vehicle. It can be provided with a standard intelligent or smart card 14 for transmitting data via the transponder, which data, in addition to certain identification data, may consist of data regarding payment conditions (whether debiting shall occur or whether pre payment via a pay card has been made).

Other elements in the block diagram relate to the stationary or fixed equipment. On the gantry 1 there is located the communication transmitter and receiver equipment 7 for microwaves as well as the position detection equipment 5. Also the video cameras 8 and 9 are shown as well as the three pairs of video cameras 10 (only one pair of which is shown), which all are identified by the same numbers in the block diagram. Other elements belonging to the stationary equipment comprise computer unit 11 for processing and tracking and a central unit 16.

The equipment for identifying the vehicles, which are not provided with any vehicle unit 12 with which payment can be ensured and for which there is a need for identification in another way for search and post-debiting, comprises the tracking cameras 9 and recording cameras 10 and an associated image processing computer which can be included in the unit 11. The tracking video cameras 9 are provided for the registration of the position and displacement of the vehicles that shall be checked particularly. The recording video cameras 10 are connected to a unit for controlling the exposure of the vehicles whose number plate or other characteristic shall be registered in the recording site, and to a unit for collecting the registered video images and compression and storing of same. These images can, via the unit 11, be communicated to the central unit 16 for post-processing in connection with search and post-debiting of vehicles that passed without paying. Finally, there is a communication unit 17 for communication with the central unit 16 for the exchange of traffic information, etc.

The in-vehicle equipment unit 12 comprises an apparatus in a box, which shall be attached, for example, at the windscreen or windshield of the vehicle. The box comprises a small, built-in transponder antenna, and interacting processor, comprising a safety module. The apparatus box is, furthermore, provided with a character display and a summer.

The vehicle unit enables a double directed or two-way microwave communication with the toll facility transceivers 7, which are part of the stationary or fixed equipment. In addition, the vehicle unit is preferably arranged to operate with a pre-paid card, smart card, which can be inserted in the apparatus box for payment of the road tolls.

Every owner of a vehicle within the area where road tolls are collected is provided with an identification card for the vehicle, which comprises all vehicle data necessary for the electronic toll system.

Pre-payment means that a customer has paid for a service or product before delivery of the service or product. Drivers who use a smart card or a pre-paid account intended for road tolls have subscribed to the pre-payment method. This method represents a convenient mode of payment for the user.

By the arrangement described herein, the fee is automatically subtracted from the remaining amount on the pre-paid card when the vehicle passes through an electronic toll station. To increase the debitable amount available, "money" can be transferred at a sales station.

The pre-payment card is the same size as a credit card. It comprises an integrated circuit with a microprocessor and a safety module. The safety module is a section designed to protect the data stored in the card. The manufacturer of such a smart card shall follow the highest international safety rules in the manufacturing process and in the construction of the integrated circuits. Such a smart card can store not only different kinds of information, including electronic money, but also safety information against loss, damage and theft.

The vehicle driver inserts the card in the vehicle unit, which thereby indicates the remaining amount of card value on the display. A certain predetermined amount is thereafter transferred automatically from the card to the safety module in the vehicle unit. Now, the vehicle unit is ready safely to perform a code controlled payment to the respective toll facility.

The summer in the vehicle unit is activated when payment has been made as an acknowledgment to the driver that the road toll has been paid at the electronic road toll facility. The vehicle unit also includes a unique identification number. It is thus fully possible that tolls are drawn from an account related to the unique number of the vehicle unit. If desired, the vehicle unit can thus function completely without a smart card, provided that the current identification number has been transmitted to the unit and stored in the safety module.

Drivers who have registered such a unique number for their vehicle unit can always choose to pay by using a pre-paid card or by drawing the toll from the account connected to the vehicle unit. It is important to point out that the central system advantageously need not be informed of the mode of payment chosen. The driver can entirely decide at each time how he prefers to pay. If he wishes to pay with a smart card, he only inserts this card, which shall contain sufficient amount, into the vehicle unit. If he prefers not to use the card, it is not inserted.

The mode of payment that is the safest and requires the least amount of data communication is pre-payment by means of a pay card. With current technique, it is, however, not possible to perform a debiting on the pay card in the short time when the communication between the transponder and the transmitter-receiver equipment of the road toll facility occurs. According to the preferred embodiment, this problem is overcome in that, when a pay card is inserted into the vehicle communication equipment, its content or a determined amount is loaded into a memory directly connected to the transponder, which memory can be included in the safety module. Hereby, the debiting operation can be carried out in the short time that is available.

Then, the procedure will be such that when the card is inserted into the vehicle equipment, a determined amount is transferred from the pay card to the transponder memory safety module. During use, a warning is given in the form of a light or sound signal when only a small predetermined amount remains stored in the memory. When the user removes the card, he is made aware of the possibilities, for example, by means of a display of re-feeding the money to the pay card within a specific period of time. An alternative to the above is that the payment transaction between the transponder and the pay card can be carried out after passage through the toll facility. Violation is dealt with at some subsequent toll station.

The pay card can be designed with an identification connected to a certain person or company so that the amount fed into the transponder memory can be kept in reserve if for a time somebody else with his own pay card uses the vehicle. The pay card can be designed as an intelligent card (Smart Card) with memory and processing unit for other purposes than as a pay card only.

The vehicle unit can also be designed so that in its memory information is registered with regard to a number of the latest used pay cards/intelligent cards so that separate information on the transaction is safely recorded, in the event that a card should be lost or become unusable. Correspondingly, an intelligent card can store information on identities in the toll facilities where debiting on the card has occurred.

The stationary equipment, the toll system, is arranged for communication between the vehicle equipment and the equipment in the road toll facility. The latter comprises, in addition to other components, antennae with controlled range.

Further the stationary equipment comprises a position detection system for the vehicles, and tracking video system and the system for recording vehicles that shall be registered particularly, and includes a computer system.

The antennae are required for communication with the vehicle units and for measuring their position. The video control system is necessary for detecting and tracking vehicles without vehicle units, as these vehicles are "invisible to the antennae". The video system is designed to record in video every vehicle that has not shown a correct payment status or has driven through the toll station without having been identified. The computer system ensures the optional processing of data in real-time, including interaction of the electronic units, and also communication with the central facility. Data may also be processed at a later time.

The antennae of the communication units 7 operating with short range are mounted on the gantry 1 above the roadway. Communication units 7 emit microwaves, which activate the vehicle unit when entering into the communication zone, that is within the operational range of the road toll facility. The activated vehicle unit answers by re-transmitting modulated waves, which are picked up by the antennae. Vehicles provided with a vehicle unit with transponder are thus detected, and also the position of the vehicle is measured by means of multi-antenna systems of the position detection units 5. Vehicles that show correct payment, or at least can be identified by means of the radio communication at the current moment can therefore be selected out or differentiated from other vehicles. Certain vehicles can, however, completely lack vehicle units while others do not have access to sufficient means or sophisticated equipment of payment for the current situation if payment shall be made through a smart card or is registered by being debited through a connected account, such as a credit or debit account. For the vehicles that have not shown a correct transaction and/or an acceptable identity, a video recording shall be registered in the recording site before the vehicle leaves the toll facility.

This recording system is needed to prevent vehicles that cannot fulfill or perform a correct payment operation from leaving the toll facility, without evidence having been secured by means of which legal measures can be taken. Consequently, every vehicle that by the radio communication has not fulfilled a correct payment or is not correctly identified, has to be registered in the road toll facility by means of the video cameras for recording its identity. The image of the vehicle number plate, for example, of the presumptive rule violator is temporarily stored in compressed form in a mass or central storing memory in the computer system. Certain information, such as the kind of rule violation and the point of time when the vehicle is recorded, is stored together with the image. These data are transferred, for example, at a later, more appropriate time, optionally with other data to the central facility.

As mentioned, recording of vehicles that pass the road toll facility without being able to identify the vehicle for a correct payment operation, requires that after having established that such a vehicle is present, the vehicle shall be identified through video recording of its number plate. This makes it necessary that the vehicle in question is tracked between the place in which the non-approved passage has been established and the place where recording takes place, so that no confusion between vehicles with authorized passage and vehicles with non-authorized passage occurs.

According to a preferred embodiment this is preformed in the following way:

1. The road toll facility transmits frequently activating signals. This is effected by microwave signals from the transmitter-receiver units 7, of the communication equipment. If the vehicle has a transponder, it will be activated to transmit an answering or acknowledgment signal which will be received by the stationary equipment.

2. By the radio activity at the stationary equipment, it is established if the vehicle is equipped with any transponder, and if such transponder can at least communicate the identity of the vehicle to the stationary equipment. In connection with this initial operation, the position detection means, detector or sensor performs the detection of the moving vehicles positions by means of, for example, the transponder. The spot in which these initial operations are performed is hereinafter called the activating position.

3. The video detection equipment comprising the tracking cameras 9 registers all vehicles on their way in the free-flow toll system under the gantry 1. These cameras operate thereby with high contrast and give a clear contour for all vehicles. These contour images are data processed and thereby an initial position for the vehicles that are recorded by the cameras can be established. This tracking of the approaching and passing vehicles is including the activating position. The tracking can thereby be performed as a continuous supervision of the passing vehicles.

4. Vehicles that have been identified with their transponder are registered further if correct payment conditions are at hand. As mentioned in the introduction, payment can be made in different ways, for example, through subtraction from a pay card in the vehicle via the transponder or other receiver-transmitter equipment or through debiting to an agreed account.

5. Through said misteriosa division of the vehicles in three payment states can now be made:

Vehicles provided with a transponder for which a correct payment maneuver can be performed;

Vehicles with a transponder making it possible to identify the vehicle by radio communication but for which acceptable payment conditions are not at hand; and Vehicles without a functioning transponder, which vehicle therefore cannot be detected by the position detection transmitter-receiver equipment of the road facility.

As to the first state, there will be no need to establish the identity of these vehicles. Generally it is provided that vehicles, for which correct payment operation can be performed, shall be anonymous with regard to the toll facility passage.

Vehicles of the second state can, per se, be identified through the transponder, so that a post-debiting can occur.

For vehicles of the third state, however, identification must take place through recording of, for example, the number plate. Vehicles of the second state can also be treated in this way as an alternative or complementary measure to identification via the transponder.

6. For vehicles of the first state the payment operation is performed. Thereby, it is communicated on command from the microwave unit 7 in question in the toll facility, the amount and information related thereto such as time and the toll facility identity the transponder and processed in the in-vehicle unit. Through modulation of the signal reflected from the transponder to the microwave transceiver in the toll station, the toll collecting operation will be performed in a number of steps in the communication cycle.

7. Vehicles of the second state for which an authentic identification can be secured through the transponder, a post-debiting application can be performed using the authenticated identification, if an approved payment condition momentarily is not established.

8. To the third state are counted or included vehicles without a transponder or which have a non-functioning transponder, as well as vehicles with a transponder communicating an identity which is not registered as authentic or not being acceptable for post-debiting. For such vehicles the identity has to be secured by means of video recording of the identity characteristic made in the recording site.

9. The recording of the number plate or other identity characteristic will, as mentioned, be performed in a recording site at a respective lane where the recording cameras 10 are positioned to catch the image of the number plates. As this camera system comprises cameras directed in both direction of traffic flow, both the front and the rear number plate can be recorded, however in different positions in the recording site.

10. Those vehicles whose number plate shall be identified through recording by means of the cameras 10 shall now be tracked at least between the position where the recording is performed, the recording site, and the position where checking of the vehicle state is made, the activating location. Consequently, it is established by the radio communication if the vehicle has an in-vehicle equipment of acceptable condition, for example, at the activating location. This successive portion tracking occurs through data processing of the initial contour recording of the displacement within the recording field of the video contour cameras 9. This means that for every contour line or contrast field used for the tracking, a number of data for related coordinates are registered, which represent the identity of the vehicle. In data processing the displacement of these coordinates within the image field facilities in the tracking of the contour for new successive position designations. It may be suitable to provide the roadway with a layer which facilities the contour determination such as a white filled layer or a grid of lines. An alternative is to also achieve a grid under or about the vehicles with the aid of a number of laser light sources.

11. The position determinations, by means of the radiowaves from the receiver-transmitter equipment for vehicles with a transponder, are processed together with the position determinations with the aid of the video position detection equipment which then generates the contour images resulting in tracking of the vehicle. Vehicles without a functioning transponder are tracked by means of video position detection equipment only.

12. As indicated, the tracking by means of the tracking video cameras 9, by vehicles equipped with functioning transponder by means of the positions detection radio equipment 5, or tracking by both systems together, has to substantially cover the vehicles passage between the activating position in which the state of each vehicle is checked and the recording site in which the number plate or other identity characteristic can be recorded. This tracking advantageously secures a correct correlation between the current state of the vehicle and its identity registered in the recording position and would be necessary or important in implementing a free-flow toll facility. By vehicles which can be tracked by means of its transponder such tracking perhaps seems to be enough. However, video camera tracking is necessary when the vehicle is not equipped with any functioning transponder. As supervision of all passing vehicles by means of the tracking video cameras is more rational than the tracking of only some vehicles. In the preferred embodiment therefore vehicles of all states are video tracked, although in practice not all vehicles need to be recorded.

13. In the recording site, at least one of the number plates or other identity characteristics of the vehicle is recorded by the recording video cameras 10. Such recording is definitely necessary only for vehicles of the third class. However, the operation for control of the payment state will take some time to perform, and therefore, it is most rational or preferable to record all passing vehicle identities for storing until it is established which vehicles have to be queried or searched for post-debiting. In the preferred embodiment, it is therefore presumed that all passing vehicles will be recorded. As the recording can be performed either before or after the initial state checking operation, the recording of all vehicle identities will be necessary in the case that the recording site is located before the checking position.

14. The exposure moment of the video recording has to be synchronized to the moment in which the identity characteristic is in the view-field of the respective camera. If the speed of the vehicle is high, the trigger for activating the camera to record has to be very exact. Thereby, the video tracking operation is very advantageous to utilize. In this operation, the speed of each vehicle can be calculated and on this basis, the momentary distance between the vehicle and the recording position the exposure can be made at the right moment.

15. In order to secure correct information for search and post-debiting, the result of the initial checking operation in the activation location has to be correlated to the recording of the vehicle identity in the recording site. This is made by connecting or correlating the position of the vehicle in the activation location at the instant of the registration with the position in the recording site at the instant of the recording of the identity characteristic as the number plate using the tracking procedure. This can only be performed by means of the tracking video cameras 9 for vehicles of the third state. For vehicles of the second state, the tracking can be performed by means of the radio position means, but optionally tracking also by the video tracking means would be advantageous. It is evident from paragraph 14 above that the video tracking is suitable to utilize as a triggering means for the recording in the recording site. Recordings which are obtained through the storing of the image recorded by the camera in the exposure or recording position, for example, in a video recorder, are correlated with the identification that is obtained by the aid of the momentary position of the vehicle recorded that has been produced in the image field of the tracking video detection cameras 9. Consequently, a mutual data processing must be performed of the vehicle registration, that is obtained in the video cameras 10 through the recording and the location of the respective cameras, and the position detection is obtained through the video detection cameras 9. Hereby, it is ensured that it is in fact a vehicle, which initially unauthorizedly has passed the toll facility, has its number plate recorded. Hereby, it can advantageously be avoided that vehicles which authorizedly has passed the road facility, are exposed to search and post-debiting because of confusion with unauthorizedly passing vehicles, due to repositioning in the distance between the initial registration and the video recording.

It will be understood from thee foregoing the video is a very rational means to secure the possibilities of an effective and correct post-debiting operation in cases where it is justified. It can also be used for other purposes. For example, the use as trigger means by the recording is already mentioned. The images recorded by the tracking cameras can also be used for investigating the fee classes relating to the vehicles. It is common to divide the vehicles of the different types as private cars or lorries with or without trailers, in different classes of fee. By means of image processing it can be determined from the dimensions of the respective vehicle which class it belongs to. This determination can be used for vehicles of the third state or class and also for checking the class information received by radio communication via the transponder by vehicles having a vehicle unit in the second class.

By the preferred embodiment, it is presumed that both tracking cameras 9 and recording cameras 10 are comprised or located in the stationary equipment. It is optionally preferable that as the tracking cameras operate, to record a view from above the road through the toll facility while or to assist the recording cameras being directed towards the front and/or rear part of the vehicle where the number plates are placed. It is however, possible to perform the tracking by means of cameras, directed in as oblique angle relative to the road, so that they can also be used as recording cameras. Such an arrangement could be an alternative to the arrangement according to the described preferred embodiment above.

The checking by means of the radio communication of all data relating to the payment operation will take some time. The time for passing the toll facility in high sped can be shorter than the time necessary for said checking and performing the payment operation thereby the recording during the tracking, if it is stored, can be used for performing the checkup in a post-operation after that the respective vehicle has left the toll facility. Thereby the video tracking result can be correlated to the result of the tracking by means of the radio position detection equipment.

In the embodiment, it is understood that all vehicles that pass into the operational range of the toll facility are recorded, and that thereafter, only those recordings are permanency registered which can be assigned to vehicles for which no correct payment operation has been performed.

However, alternatively, it is possible to register only those vehicles for which no correct payment operation has been performed. Then, however, the recording must take place when the vehicle has passed the distance in which the microwave communication performs the check of the payment status.

Even if such an alternative is fully possible it will mean that the equipment in the toll facility is divided in two arrangements, one with the equipment for the microwave communication and video detection equipment and a second with the recording equipment; in practice two gantry devices. From a constructional point of new the preferred embodiment will therefore be more advantageous.

Even if it is here understood the recording of an image of the number plate or other characteristic, it does not exclude that the recording can take place in any other way, for example through reading, of the number code of the plate or other code.

It can be mentioned that in the preferred embodiment, the radio equipment does not need to track the displacement of the vehicle but only detect and initially establish a position. which has been correlated to a corresponding position established by means of the video cameras. Thereafter, tracking can occur by means of the cameras only with identification of the vehicle on the basis of an identity allotted to it in the registering of the initial position.

It may be understood that for vehicles of different kinds, there are different fees such as a higher fee for trucks than for passenger cars. It is thereby suitable that thee is fed into the t transponder data on one or more fee classes, so that a correct debiting can occur. In order to counteract or prevent that anyone informs an incorrect fee class or given other faulty information via the transponder, it may be appropriate to have checks in with the design of the vehicle is compared with information in the transponder. This is, as described, suitably effected by means of the video detection equipment and which in such case is arranged to determine data regarding the height, width and length of the vehicle etc.

What is claimed is:

1. A method for registration vehicles in a road toll facility, the method comprising the steps of:

providing at least a toll facility arranged with a passage through which the vehicles are intended to pass for registration in order to perform toll fee collecting operations, providing the toll facility with a radio communication means configured to communicate with in-vehicle radio communication equipment, providing first processor means connected to the toll facility and configured the process toll collecting operations in communication with said in-vehicle radio equipment, providing vehicles with said in-vehicle radio communication equipment, and providing vehicles having said in-vehicle radio communication equipment with second processor means configured to be in communication with the radio communicating means of the toll facility, process data relating to the toll collecting operation to be transmitted by said in-vehicle radio equipment to the radio communication means of the toll facility, providing the toll facility with means configured to record identity characteristics as the number plates of at least some of the toll passing vehicles in a recording site of the toll facility, whereby in an activating location of the toll facility the radio communication equipment of the toll facility and the in-vehicle radio communication equipment are activated to perform an initial operation in order to register, in the first processor means, the state of the vehicle and the in-vehicle radio communication equipment including the vehicle provided with the in-vehicle radio communication equipment and the second processor functioning for communication with said toll facility or that the vehicle has no such functioning equipment, characterized in that each of the vehicles is tracked on a path through the passage of the toll facility between an activating location and a recording site in order to correlate the result of the initial operation with the recorded identifier characteristic, by registering the path between the two positions and thereby the position of the vehicle at a recording site in the recording instant, thereby providing the toll facility with first tracking means in the form of at least one video camera configured to record the path of the vehicles between the activation location and the recording site and connected to the image processor configured to produce data representing said path, and providing the toll facility with second tracking means in the form of at least one radio position detection means connected to the radio communication means and configured to register the position of the respective vehicle at least in the activation location at the instant of the initial operation and to produce data representation and position, so that said correlation can be made by comparing the data representing the result of the initial operation the vehicle position at the instant of the initial operation and the path of the respective vehicle between the recording site and the activation location thereby making it possible to secure the identity of vehicles for which a correct toll collecting operation has yet been performed.

2. The method according to claim 1, wherein the at least one radio position detecting means of the toll facility is configured to produce date relating to the successive position of the vehicles along at least a part of the path between the activating location and the recording site, said data being compared to path data for the path of the same vehicle at a substantially same instant obtained by means of the video tracking system.

3. The method according to claim 2, wherein the path data relating to the successive positions of the path of the vehicle and obtained by means of the video tracking means in the image processing is associated with a symbol following the image of the vehicle in the tracking operation and utilized and in the data processing for correlating the position obtained by means of the radio position detection means and the identity recording of the same vehicle.

4. The method according to claim 1, wherein the toll facility radio position detection means is configured to process the detection and communication with the in-vehicle radio communication equipment, whereby the lack of a functioning of the in-vehicle radio communication equipment and thereby lack of position detection data in the correlating processing in comparison with the videotracking data is utilized as an indication that the respective vehicle has to be recorded as being in a vehicle class which has not performed a correct toll collecting operation.

5. The method according to claim 1, wherein the toll facility is arranged for free flow traffic through the same.

6. The method according to claim 1, wherein the processor means of the toll facility is configured to trigger said recording of the identity characteristic of the respective vehicle at a time calculated on base of data from the video tracking means representing said vehicle path and the current speed of the vehicle so that the time of the recording is synchronized to the moment in which the vehicle is in the viewing field of the recording cameras.

7. A method for registration of collecting toll fees in a road toll facility which is comprising:

a radio communication means configured to communicate with vehicles provided with on-board radio communication means, a radio vehicle position detection means, a video tracking means and image processing means provided to produce data representing the successive positions in at least a part of a path of the vehicle passing through the road toll facility, and a recording means in a recording site of the road toll facility provided to send the identity characteristic of at least some of the passing vehicles, the method comprising the steps of (a) detecting, by means of the radio communication means of the road toll facility, when approaching vehicle reach an activation location, (b) registering by radio communication at least one state of the vehicle present in the activation location, the state being at least that the vehicle is provided with communication equipment or has no functional communication equipment, (c) registrating by means of the radio vehicle position detection means data representing the position of the vehicle in the activation location at the moment of said registrating of vehicle state step (b), (d) tracking, by means of the video tracking, means producing successive data representing successive positions of the vehicle during passage between the activation location and the recording site, (e) activating, by means of said successive data produced in the video tracking step (d) and representing a current position and speed of the vehicle using the recording means to obtain a record of the identity characteristic of the vehicle at a moment in which the position of the vehicle is appropriate for obtaining the record, (f) registrating the position of the vehicle in the recording site at the moment of activating of the recording means, (g) processing the position data from the radio position detecting means and from the video tracking means, (h) correlating the state of the vehicle with the record of the identity characteristic of the same vehicle by connecting the position at a first moment of the registrating with the position at a second moment of recording by means of video tracking during the period between first and second moments, so that the vehicle, which has the no functional communication equipment can be correctly identified.

8. A method according to claim 7, wherein the activating of the record means is effected after that the vehicle has been registrated in the activation location.

9. A method according to claim 7, wherein the registration in the activation location is effected after that the vehicle has been recorded in the recording site.

10. A device for registration of vehicles in a road toll facility arranged with a passage through which the vehicles are intended to pass for registration in order to perform a toll fee collecting operation, the device in the road toll facility comprising, a radio communication means configured to communicate with in-vehicle radio communication equipment, processor means configured to process toll collecting operations in communication with said in-vehicle radio equipments, the processor means being provided to activate the radio communication means in communication with the in-vehicle radio communication equipments in an activation location of the toll facility, to register a state of the vehicle including at least that the vehicle is provided with the radio communications equipment for communication with said toll facility communication means or that the vehicle has no functioning in-vehicle radio communication equipment, recording means configured to record in a recording site of the toll facility, and identity characteristics as the number plates of at least some of the toll passing vehicles, characterized in that the device further comprises videotracking means including at least one video camera and an image processor means connected thereto and provided to produce path data representing the path of the vehicle in the road toll facility at least between the activating location and the recording site, and radio vehicle position detection means provided to produce position data representing the position of the vehicle at least in the activation location at the time of the activation of said registration for the same vehicle, wherein the processor means of the road toll facility being provided to correlate the position obtained by means of the radio position detection means and relating to the position of the vehicle in the activation location at the time of the activation of the said registration with the path data representing the path of the respective vehicle and thereby the position in the recording site at the time of the recording, so that the registration result is correlated to the relevant recording of the same vehicle's identity characteristic.

11. The device according to claim 10, wherein the radio position detection means of the road toll facility is provided to process the detection and communication with the in-vehicle radio communication equipment, whereby the processor means is provided to indicate by the processing of the data obtained from the video tracking means tracking the vehicle lacking said in-vehicle radio communication equipment and thereby not connected to any radio position detection data, the identity recording of the vehicle which has not performed a correct toll collecting operation.

12. The device according to claim 10, wherein the in-vehicle radio communication equipment includes a transporter.

13. The device according to claim 9, wherein the radio vehicle position detection means is provided to perform the detection operation in communication with the transponder of the vehicle.

14. The device according to claim 10, wherein the radio vehicle position detection means comprises at least one unit including at least one transmitter antenna and at least two receiver antennae, and a processor connected to the receiver antenna and provided to calculate the position by means of a value of the phase difference between signals from different receiving antennae after a frequency carrying signal from the transmitter antenna has been retransmitted by the transponder.

15. A system for registering vehicles in a road toll facility, said road toll facility including a radio transmitter and receiver equipment configured to communicate with vehicle units arranged in each vehicle such that on receipt of a command from the radio transmitter of said road toll facility each vehicle unit communicates adequate data for performing a debiting operation regarding a toll, said radio transmitter and receiver equipment further including computer equipment configured to separate out vehicles for which a correct debiting operation has been performed by means of each vehicle unit, from vehicles for which a correct debiting operation has not been performed, the system comprising:

(a) means for detecting a vehicle unit passing through said road toll facility;

(b) at least one video camera for registering an initial position and displacement of each vehicle traveling along a path between an activating location and a recording site of said road toll facility, and for determining successive positions of a vehicle passing through the toll facility;

(c) image processing equipment connected to each video camera and arranged to track vehicles passing through said road toll facility between an entry position and any point in the toll facility in which said radio transmitter and receiver equipment, including the computer equipment, is arranged to identify each vehicle for which a correct debiting operation has been performed, said image processing equipment configured to collect and produce registered image data;

(d) means for recording a number plate or identity characteristic of the vehicle; and (e) means for storing recordings of an identity characteristic of the vehicle for which a correct debiting operation has not been performed, said means for storing configured not to perform the storing of recordings of vehicles for which a correct debiting operation has been indicated as performed.

16. A method for registering vehicles in a road toll facility, the method comprising the steps of:

(a) providing at least a toll facility having a passage through which vehicles pass and are registered using toll fee collecting operations;

(b) providing the toll facility with communication means for communicating with and detecting an in-vehicle communication equipment;

(c) providing the toll facility with first processor means whose communication with said in-vehicle communication equipment triggers processing of toll collecting operations;

(d) providing a vehicle with said in-vehicle communication equipment;

(e) providing said in-vehicle communication equipment with second processor means for communicating with said communication means in processing toll collecting operations data transmitted by said in-vehicle communication equipment to said communication means of said toll facility;

(f) providing the toll facility with video recording means for recording at least one identity characteristic of at least one vehicle passing through a recording site of said toll facility;

(g) providing the toll facility with first tracking means for registering an initial position and displacement of each vehicle traveling along a path between an activating location and said recording site, and with an image processor means for collecting and producing registered image data;

(h) registering, in the first processor means and as an initial operation, displacement of each vehicle and each in-vehicle communication equipment through the toll facility, said registering occurring in said activating location of said toll facility when said communication means of the toll facility and the in-vehicle communication equipment are activated to perform said initial operation;

(i) correlating a result of said initial operation with a recorded vehicular identity characteristic by both tracking, between said activating location and said recording site, a path of each vehicle passing through the toll facility, and by registering, at said activating location and at said recording site, a position of each vehicle traveling along said path while said vehicle passes through the toll facility;

(j) providing the toll facility with at least one second tracking means for both registering a position of a vehicle in said activating location at an instant of said initial operation, and for producing registered image data; and (k) further correlating said result of said initial operation with a recorded vehicular identity characteristic by comparing data representing vehicle position at an instant of said initial operation with data representing said path a vehicle traveled between said recording site and said activating location, said further correlating producing image data representing an identity of each vehicle passing through the toll facility for which a toll collection operation is performed.

17. The method according to claim 16, further comprising the method steps of producing, via each second tracking means, both position data and path data, respectively, relating to each successive position of a vehicle along a portion of said path, between said activating location and said recording site, and comparing said position data of a vehicle to said path data for the same vehicle at a substantially same instant.

18. The method according to claim 17, further comprising the steps of associating path data, relating to a portion of a path of the vehicle and obtained using the video recording means in image processing, with a symbol representing registered image data of said vehicle, and using all associated, symbolized data in data processing for correlating vehicular identity and position.

19. The method claim according to claim 16, further comprising the steps of configuring said second tracking means to process detection of and communication with said in-vehicle communication equipment, and treating absent position data, produced by communication between said second tracking means and each non-functioning in-vehicle communication equipment, as a condition for triggering operation of said video recording means for recording an identity characteristic of a vehicle containing said non-functioning in-vehicle communication equipment.

20. The method claims according claim 16, further comprising the step of arranging the toll facility as a gantry whose elongated, spaced horizontal bars extend perpendicular to a direction of vehicular traffic for free flow traffic therethrough.

21. The method according to claim 16, further comprising the step of configuring the first processor means of the toll facility to trigger said recording of an identity characteristic of a vehicle by said video recording means when a vehicle, not equipped with a functioning transponder or lacking a transponder, enters a recording site of said toll facility, so that at an instant said first tracking means registers a contour image of said vehicle, said video recording means is activated to capture said identity characteristic of said vehicle as said vehicle enters a recording site of said toll facility.

22. The method according to claim 16, further comprising the step of permanently registering a recording of each vehicle for which correct payment operation is not performed.

* * * * *